Figure 1:
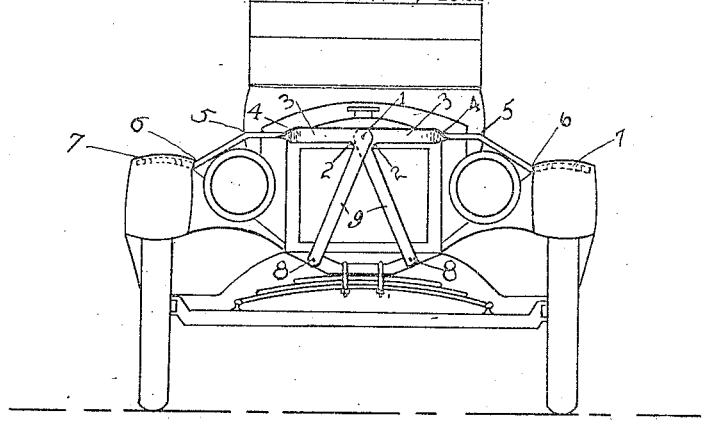

Patented May 29, 1923.

1,457,144

UNITED STATES PATENT OFFICE.

FRED L. BRONSON, OF WICHITA FALLS, TEXAS.

FENDER BRACE FOR AUTOMOBILES, CARRIAGES, AND THE LIKE.

Application filed October 3, 1922. Serial No. 592,180.

*To all whom it may concern:*

Be it known that I, FRED L. BRONSON, a citizen of the United States, residing at Wichita Falls, in the county of Wichita and State of Texas, have invented a new and useful Improvement in Fender Braces for Automobiles, Carriages, and the like, of which the following is a specification.

The invention relates to a fender brace for automobiles, carriages and the like and is designed to connect two corresponding opposite fenders to a fixed part of the vehicle by means of two similar metal bars, preferably of steel, of suitable dimensions, which are connected to each other at approximately the center of the vehicle by a bolt, rivet or other suitable fastening, and fastened to some fixed part of the vehicle, the same preventing undue vibration of the fenders.

Another object of the invention is to provide a brace of the nature stated to be used as an accessory or attachment and which may be applied to the vehicle as a permanent fixture, or be removed therefrom as desired.

Another object of the invention is to provide a brace of the nature stated which is very simple, practical, cheap of manufacture and which may be easily and quickly installed.

The nature and advantages of the invention will be better understood on reference to the following detailed description when taken in connection with the accompanying drawing. The invention resides in the construction, combination and arrangement of parts as more fully disclosed hereinafter and claimed.

Figure 2:
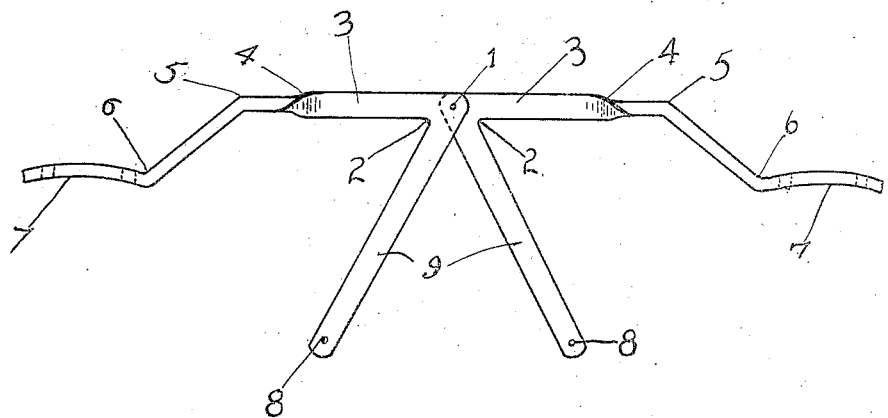

In the drawing forming a part of this application the various parts are referred to by numbers, and wherein:

Figure 1 is a front view of an automobile showing the manner of using the invention, and Figure 2 is an enlarged elevational view of the brace.

The brace forming the subject matter of this invention comprises two similar members 3 which are attached at their outer ends to the underside of the fenders at 7 by bolts, rivets or other suitable fastening means, and which have their inner lower ends secured to the chassis or running gear of the vehicle, at 8, in any preferred way. Each of the members is of similar or like formation and comprises an outwardly disposed fender supporting arm 4 and a downwardly extending stay arm 9. These two arm 4 and 9 are disposed relatively at an angle which results in the provision of a member of approximately V-form. The stay arm 9 is preferably straight and the fender supporting arm 4 comprises an inner straight portion, an intermediate inclined portion 6 and an outer curved portion 7 which conforms to the transverse curvature of the fender to obtain a snug thereagainst. The two members are pivotally connected at the point of divergence of the arms 4 and 9, as indicated at 1, with the result that the members mutually brace and strengthen each other. Lateral movement of the lower ends of the stay arms 9 results in a corresponding vertical movement of the outer ends 7 of the fender supporting arms 4 and as a result provision is had for easily and quickly adapting the brace for different makes of vehicles. Each of the members may be formed of a flat bar of metal, preferably steel, which is bent intermediate its ends to provide the relatively angularly disposed arms 4 and 9, and the outwardly disposed fender supporting arm 4 is given a one-quarter twist, as indicated at 5, whereby to bring the outer flattened portion in horizontal position and the inner portion in vertical position.

The brace may be cheaply manufactured and easily and readily placed in position and will support corresponding oppositely disposed fenders in a manner to prevent their loosening and rattle and obviate sag, and after the brace has been properly adjusted, the lower ends of the stay arms 9 may be secured in any manner to a substantial part of the chassis or running gear, according to the nature of the vehicle.

What is claimed is:

A brace for the wheel fenders of a motor vehicle, comprising arms arranged in front of and extending transversely of the radiator and having their outer ends attached to the fenders, arms extending downwardly from the inner ends of said first arms and attached at their lower ends to a convenient portion of the vehicle adjacent the base of the radiator, and means pivotally connecting the first named arms.

FRED L. BRONSON.